United States Patent [19]
Howeth

[11] Patent Number: 5,607,189
[45] Date of Patent: Mar. 4, 1997

[54] ROTARY JOINT FOR PRESSURIZED FLUIDS

[76] Inventor: D. Franklin Howeth, 2935 St. Louis Ave., Fort Worth, Tex. 76110

[21] Appl. No.: 317,122

[22] Filed: Oct. 3, 1994

[51] Int. Cl.[6] ................................................. F16L 35/00
[52] U.S. Cl. ........................... 285/39; 285/190; 285/276; 29/890.14
[58] Field of Search ......................... 285/39, 211, 212, 285/220, 190, 276; 29/890.14

[56] References Cited

U.S. PATENT DOCUMENTS

| 1,532,774 | 4/1925 | Page. | |
|---|---|---|---|
| 1,949,961 | 3/1934 | Hansen | 285/184 |
| 1,985,012 | 12/1934 | Boehm | 285/9 |
| 2,307,328 | 1/1943 | Martin | 285/96.3 |
| 2,400,658 | 5/1946 | Shepherd | 285/96.3 |
| 2,481,404 | 9/1949 | Donner | 285/96.3 |
| 3,002,769 | 10/1961 | Deublea et al. | 285/190 X |
| 3,402,253 | 9/1968 | McCracken | 285/190 X |
| 5,000,488 | 3/1991 | Albrecht | 285/39 X |

FOREIGN PATENT DOCUMENTS

| 527985 | 1/1951 | Belgium | 285/220 |
|---|---|---|---|
| 1805641 | 5/1970 | Germany | 285/39 |
| 2837977 | 3/1980 | Germany | 285/190 |
| 428344 | 7/1967 | Switzerland | 285/190 |

OTHER PUBLICATIONS

Catalog HC-100, "Fluid Conducting Swivel Joints", ©1987 by Hydraulics, Inc., pp. 7, 9 and 27.

Primary Examiner—Dave W. Arola
Attorney, Agent, or Firm—Harris, Tucker & Hardin, P.C.

[57] ABSTRACT

An improved rotary joint construction is produced by eliminating the external drive mechanism used for installing and removing such joints. An internal drive mechanism is provided within the bearing area of the stem which does not alter rated flow volume and which does not add to the length of the stem. The internal drive mechanism comprises a socket in the end of the stem which allows the joint to be installed or removed without using special tools. A more compact shorter joint can be produced without reducing the distance between the seals and without reduced rated flow volume and without reducing the contact area of the between the stem and barrel. Alternately, a joint with substantially increased bearing contact area and a longer barrel can be produced without increasing the stem installation clearance height and without reducing the interseal spacing flow passage geometry and subsequent rated flow volume. The longer bearing surface and a longer barrel provides longer life by reducing the maximum possible gap in the seal area as a result of misalignment caused by side loading of the barrel and reduces wear. The increased length of the bearings and barrel permit a substantial increase in operating pressure without undesirably extruding the seals.

23 Claims, 2 Drawing Sheets

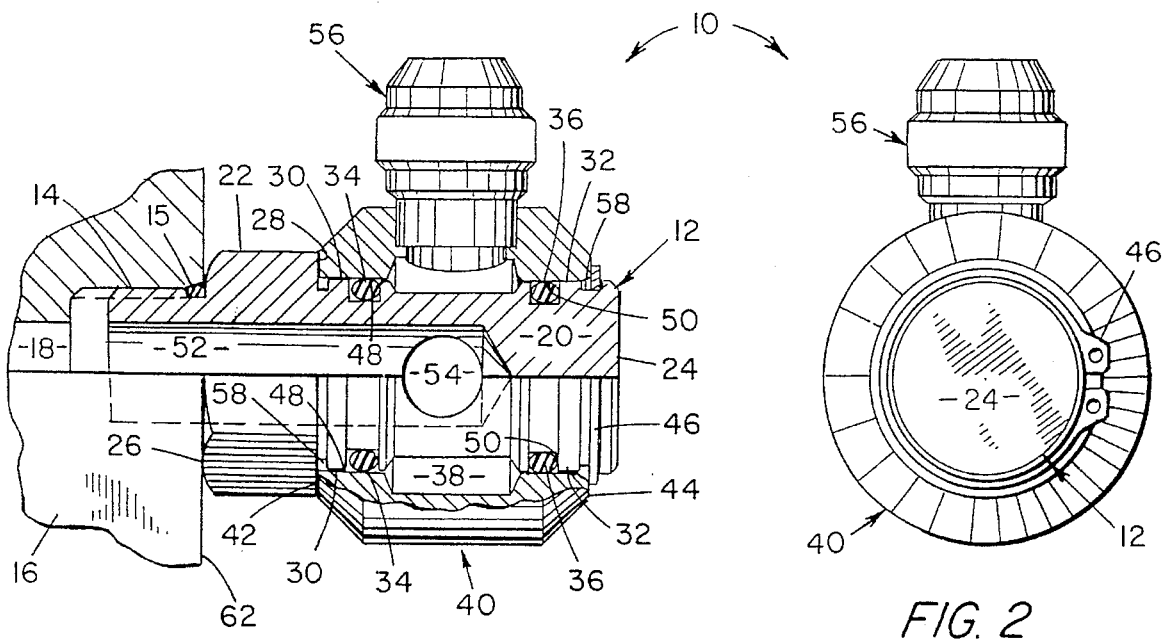
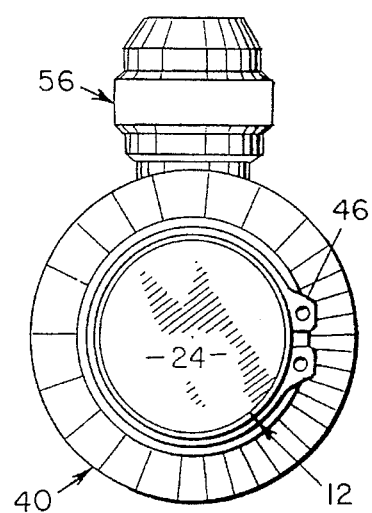
FIG. 1 (PRIOR ART)
FIG. 2 (PRIOR ART)
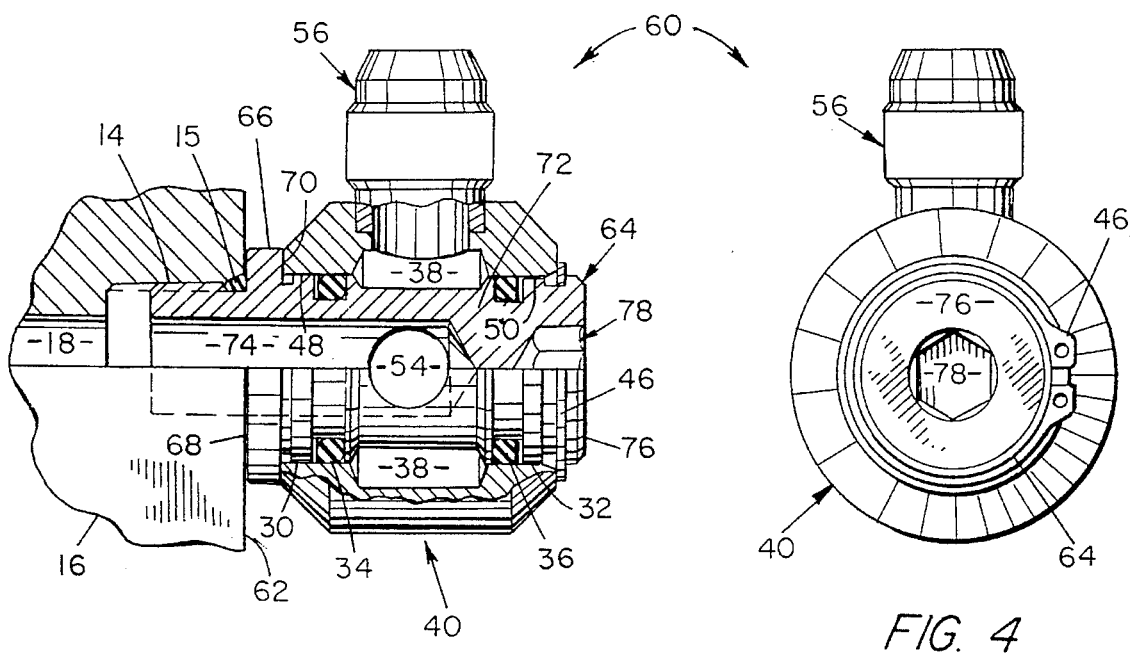
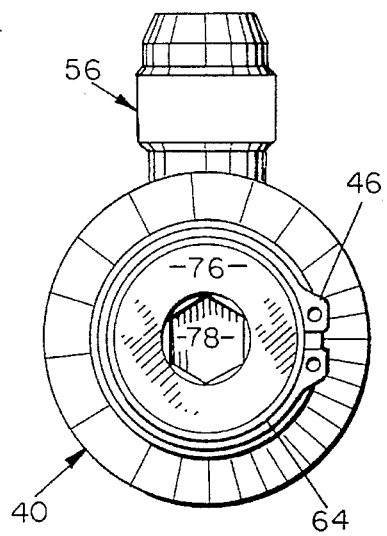
FIG. 3
FIG. 4

ROTARY JOINT FOR PRESSURIZED FLUIDS

FIELD OF THE INVENTION

The invention lies in the field of pressurized fluid joints, more particularly, rotary or swivel joints.

BACKGROUND OF THE INVENTION

Fluid conducting rotary joints or swivel joints are known in the art for transmitting high pressure operating fluid, such as hydraulic fluid, in heavy equipment with moving parts such as lifting devices, log loaders, cranes and material handling equipment. These are also known as fluid conducting swivel joints which are especially useful for equipment that lifts and rotates. Examples of specifications of conventional fluid conducting swivel joints are represented by copy of a catalog from Hydraulics, Inc. of Fort Worth, Tex., in which the cover page and pages 7, 9 and 27 are attached as an Appendix and incorporated by reference.

The conventional fluid conducting rotary joint transmits fluid under pressure from a pump source to hydraulic cylinders or other fluid operated equipment. The joint may also return fluid under reduced pressure from the fluid system back to pump supply. They generally include a stem portion with an integral hex drive nut and threaded portion which screws into the threaded connection of a source of pressurized fluid by means of a wrench which turns the drive nut on the connection end of the joint. A closely fitted barrel is supported on the remainder of the stem. Fluid volume rated flow path through these mating components is arranged to divert flow direction 90 degrees. The barrel has an outlet port in communication with an opening in the connection end of the stem through a fluid chamber or annulus in the center of the swiveling portion of the joint. Longitudinally spaced inner and outer bearing surfaces on the outside of the stem and the inside of the barrel are interengaged. Spaced-apart seals separate the bearing surfaces and form a transfer chamber where rated volume flow of fluid may be bi-directionally transferred from the interior of the stem to a confined area between the stem and barrel which leads to an opening in the barrel with a connection to an output line.

The geometry of joint installations, heavy and abusive loads, wear and dangerous operating pressures impose severe constraints on rotary joint construction. Many of these joints are required to operate at 3,000 psi. Advances to fluid power operating pressures in machinery demand operation of even higher pressures with good fluid throughput. Designers design on the basis of obtaining about 15 feet/ second velocity through conductors of a nominal given bore size. This establishes the rated flow volume for each component. Current rotary joint support bearings are taxed by these requirements and are often short lived causing down time and high maintenance expense in the field. Current rotary joint seal gland clearances and especially the increase in these clearances from support bearing wear result in reduced seal life. Increased fluid pressure causes premature failures. Even a small gap between the bearings of the stem and barrel permits extrusion of the "O"-ring seals causing damage which results in leakage and ultimate failure of the seals.

Furthermore, mobile equipment engineers and others are driven to reduce equipment size for cost and weight reduction and this has resulted in a need for a reduced component size to fit in smaller spaces. Finally, loss of hydraulic fluids from such joints is becoming less tolerated due to a desire to protect the environment. Fluid loss from short lived products with unpredictable performance is not acceptable and price premiums are becoming common for products which can overcome these shortcomings. The stem installation clearance is the height of the joint above the primary fluid connection. It would be desirable to produce a high pressure rotary joint of rated volume having a reduced stem installation clearance to fit in smaller spaces. It would also be desirable to produce a joint for the same stem installation clearance with an increased barrel height and longer bearing surfaces to produce a rotary joint with greater wear resistance, strength and the ability to operate under higher pressures without extruding the seals. It would be desirable to produce a rotary joint of rated volume fluid flow for the same stem installation clearance wherein the stem and barrel side load angle of misalignment caused by loads placed on the barrel by hanging hoses is significantly reduced as compared to conventional rotary joints with equal diametrical clearance between the stem and barrel. Reduction of side load angle misalignment reduces the tendency of the seals to extrude under pressure and allows higher operating pressure under severe conditions. It would be desirable to produce these results without compromising support bearing length, fluid throughput velocity and volume and without requiring special installation and removal wrenches which are not commonly available in the field. The invention herein disclosed accomplishes all these purposes and more.

OBJECTS OF INVENTION

Among other objects of the invention is an improved fluid conducting rotary joint providing elements necessary for reduced installation envelope, increased load bearing capacity, and increased capacity for fluid seal integrity without reducing rated fluid flow volume.

An object of this invention is to provide an improved fluid conducting rotary joint comprised of a conventional barrel and having a stem for threaded mating to a fluid flow port through improved stem rotation driving means located within the load bearing section of the stem.

Yet another object is to provide a rotary joint having support bearing and seal glands comparable to existing joints wherein the improvement includes substantially decreased stem installation clearance.

A further object is to provide a fluid conducting rotary joint comparable to the stem installation clearance of existing joints wherein the improvement includes increased stem and barrel support bearing length resulting in relatively improved bearing and seal life. A still further object is to provide a rotary joint having stem to barrel support bearing and fluid gland diametrical manufacturing dimensions and tolerances comparable to existing joints and having a stem installation envelope comparable to existing joints wherein the improvement includes increased stem and barrel length relation which reduces the permitted angle of stem to barrel misalignment under side load conditions as compared to existing joints whereby reduced seal gland clearances encourage extended seal life under high fluid pressures.

A still further object is to provide a rotary joint having stem to barrel support bearings and fluid gland diametrical manufacturing dimensions and tolerances comparable to existing joints and a stem installation envelope comparable to existing joints wherein the improvement includes increased stem and barrel length permitting extended length of opposing stem and barrel support bearing surfaces for increased resistance to wear whereby rotary joint life is made acceptable to use requiting attached relatively heavy and rigid fluid conductors.

SUMMARY OF THE INVENTION

The invention disclosed is an improvement in rotary or swivel joints for a high pressure fluid transfer system primarily used in hydraulic systems for machinery and equipment having moving parts. The preferred embodiment of the invention provides a 90-degree flow direction transition in a rotary joint wherein the barrel is pressure balanced in relation to the stem and the length of the barrel is that necessary to accommodate the stem flow parts, seal glands and support bearings. The length of the stem is that necessary to accommodate the barrel, barrel seat, barrel retainer, fluid port thread boss and the means for the driving the thread boss for engagement to the fluid power system mating component fluid port.

In the improved joint, the drive mechanism which is conventionally located outside the bearing area of the stem and rotating barrel is located within the bearing area of the stem without adding any length to the stem and without compromising rated fluid flow volume. The preferred drive mechanism comprises a socket which is accessible from the end of the stem by a commonly available conventional wrench. Since there is no external drive mechanism, a preferred embodiment can be produced with a significantly shorter stem installation clearance height over the existing product without reducing the height of the barrel. Alternately, the preferred embodiment can take the form of a rotary joint having the same stem installation clearance height as a comparable capacity existing product with a significantly increased barrel length and correspondingly increased stem length above the barrel seat. This permits significantly longer bearing surfaces on the stem and barrel without compromising rated fluid flow volume. Contact area between the bearings of the stem and barrel is greatly increased which results in lower unit bearing pressures and significantly reduced wear of the bearing surfaces under heavy loading. For the same stem installation clearance as compared to the comparable existing product, the stem and barrel side load angle of misalignment is reduced significantly as compared to conventional joints with equal diametrical clearance. The change in geometry occasioned by the greater distance between the outer most portions of the bearings and the increased barrel length reduces a maximum permissible gap in the vicinity of the opposed seals between the stem and barrel which reduces the tendency of the seals to extrude into the small gap produced by load induced misalignment. This effect, coupled with the much greater resistance to wear, increases the life of the rotary joint and makes it possible to significantly increase the operating pressure as compared to an otherwise comparable conventional joint with the same stem installation clearance and volume flow rate.

More particularly, the preferred embodiment is a pressurized fluid rotary joint comprising a stem having an inner end equipped comprising a connection end having threads for connection to a pressurized fluid source and a relatively thin collar above the threads having the thickness defined by a lower abutment surface and an upper surface which serves as a barrel seat, the stem having an upper portion extending outwardly from the barrel seat to an outer end and a removable barrel which fits over the upper portion of the stem. The barrel has a lower end which is supported on the barrel seat and an upper end proximate the outer end of the stem which is held by a retaining ring mounted at the outer end of the stem. The upper portion of the stem has a lower support bearing adjacent the barrel seat, an upper support bearing adjacent the outer end of the stem and a pair of spaced apart seals comprising a lower seal and an upper seal which separates the support bearings and form a fluid transfer chamber between the upper and lower portion of the stem and barrel. The barrel has cooperating upper and lower support surfaces that cooperate with the upper and lower support bearings of the stem. The spaced apart bearings and support surfaces are separated by the fluid transfer chamber in a central portion of the barrel. A pressurized fluid flow passage in the stem communicates with the fluid transfer chamber and delivers pressurized fluid at rated flow volume to an external connection on the barrel. The outer end portion of the stem incorporates a drive mechanism extending within the bearing area of the stem comprising a socket opening for a conventional wrench for tightening and loosening the stem. The drive mechanism provided is entirely internal and does not contribute to the length of the stem nor interfere in any way with the fluid pressure and flow volume use of the joint. The elimination of the height of the drive nut conventionally located below the barrel outside the bearing area makes the decrease in stem installation clearance possible by reducing the overall height or alternately increasing the length of the barrel and the length of the outer portion of the stem at an equal stem installation clearance height. A particular advantage in manufacturing the stem is the fact that the integral collar is round making it possible to make the stem out of round bar stock instead of hexagon bar stock. This increases cutting tool life and increases machining rates and, therefore, lowers manufacturing cost.

BRIEF DESCRIPTION OF THE DRAWINGS

FIG. 1 is a partially cutaway elevational view of a prior art 90 degree fluid conducting rotary joint connected to a pressurized fluid port in a hydraulic system;

FIG. 2 is an end view of the joint of FIG. 1;

FIG. 3 is a partially cutaway elevational view of the 90 degree fluid conducting rotary joint of the invention connected to a pressurized fluid port illustrating a reduced stem installation clearance height;

FIG. 4 is an end view of the joint of FIG. 3 showing a recessed drive socket in the end of the stem;

DETAILED DESCRIPTION OF THE INVENTION

Figure 5:
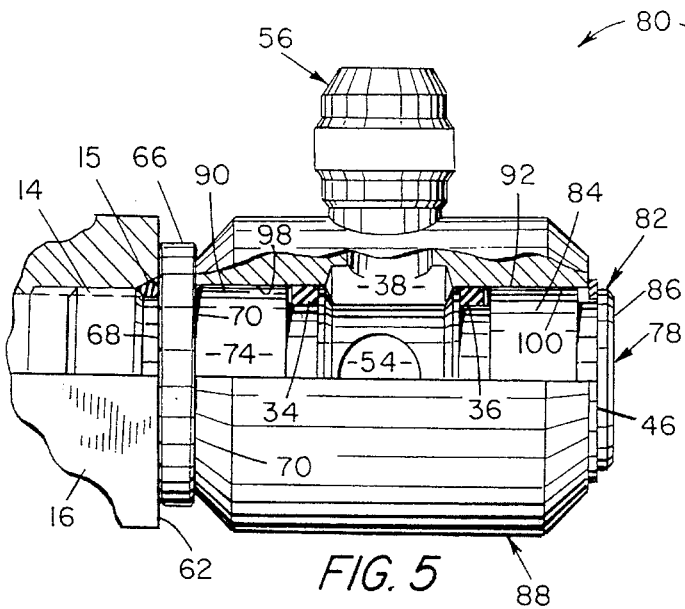
FIG. 5 is a partially cutaway elevational view of a modification of the 90 degree fluid conducting rotary joint of FIG. 3 in which a longer barrel and longer stem with lengthened bearings are incorporated at the same stem installation clearance height of FIG. 1 without increasing the spacing of the seals separating the bearings.

In the description which follows, the same parts will be referred to by the same reference numbers. In FIGS. 1 and 2 a 90 degree pressure balanced prior art rotary swivel joint is referred to generally by the reference number 10. An elongated stem 12 is formed from hexagonal stock. Stem 12 has a threaded connection end 14 having a seal 15 which is shown threaded into a pressurized fluid connection 16 having pressurized fluid passage 18 on the pump side of the assembly. Stem 12 has an outer end portion 20 separated from connection end 14 by a drive nut 22 located outside the bearing area. Outer end portion 20 extends oppositely from the connection end to an outer end 24 which may also be referred to as the upper end. Drive nut 22 has an abutment surface 26 and a barrel seat 28 which defines the height of drive nut 22 and separates connection end 14 from outer end portion 20.

Looking from left to right, outer end portion 20 has a pair of support bearings comprising a lower support bearing 30 proximate barrel seat 28 and an upper support bearing 32 proximate outer end 24 of the stem and a pair of seals spaced apart by a seal distance comprising a lower seal 34 and an upper seal 36 which separate support bearings 30, 32. Seals 34, 36 comprise "O"-rings held in annular grooves which define a fluid transfer chamber 38 in cooperation with the barrel.

A removable barrel generally designated 40 closely fits over outer end portion 20 of stem 12. Barrel 40 has a lower end 42 supported on barrel seat 28 and an upper end 44 proximate outer end 24 of the stem, which is held by a retaining ring 46 mounted at the outer end 24 of the stem. Barrel 40 has a lower support surface 48 which is longer than the width of bearing 30 so that it simultaneously turns on bearing 30 and seals against seal 34. Barrel 40 has an upper support surface 50 which turns on support bearing 32 and simultaneously seals against seal 36. A pressurized fluid passage 52 in stem 12 comprises a blind opening which communicates through two ports 54 into annular fluid transfer chamber 38 in the center of the barrel which delivers pressurized fluid to an external connection 56 on barrel 40. Normally a flexible hose would be attached to connection 56 to deliver pressurized hydraulic fluid to hydraulic cylinders or other operating systems. A small annular gap 58 is provided at the lower edge of lower support bearing 30 and at the upper edge of upper support bearing 32 for a conventional dust seal.

An improved fluid conducting rotary joint 60 is shown in FIGS. 3 and 4 having a substantially reduced stem installation clearance. The stem installation clearance is defined as the distance between the abutment surface 62 of connector 16 and the extreme outer end 76 of the elongated stem 64 of improved joint 60. Barrel 40 is the same as that of FIG. 1. However, the overall height of improved joint 60 is reduced because relatively thick drive nut 22 had been replaced by relatively thin collar 66 having a height in the longitudinal direction defined by the distance between abutment surface 68 and barrel seat 70. It can be seen that collar 66 separates connection end 14 of stem 64 from its upper end portion 72. The collar is preferably an annular disc with a curved outer periphery or round. Upper end portion 72 has the same spaced apart upper and lower support bearings 30, 32 and the same spaced apart seals 34 and 36 which separate the bearings by the same distance between the seals as the joint of FIG. 1 and in cooperation with barrel support surfaces 48, 50 forms transfer chamber 38. Pressurized fluid moves from passageway 18 through passage 74 in stem 64 through ports 54, transfer chamber 38 and out through external connection 56.

It can be seen that integral collar 66 performs all of the functions of drive nut 22 except one. Because of reduced clearance between barrel 40 and abutment surface 62 there is insufficient space to insert an appropriately sized conventional wrench to tighten or loosen stem 64 against connection 16. Collar 66 is no more than the thickness of a thick washer. The collar does have certain strength requirements. It must be able to withstand the loads imparted to the barrel by fluid conductors connected thereto. It must be able to withstand the loads imparted by engagement of the mating components when it is tightened in place.

The outer end of stem 64 is provided with a means for tightening stem 64 to connection 16 without increasing the stem installation clearance. Outer end 76 of stem 64 is provided with a centrally positioned socket opening 78 equipped with lands to receive a conventional wrench for rotating stem 64 to secure or remove threaded connection end 14 from a source of pressurized fluid. Socket 78 constitutes a drive mechanism which is located within the bearing of the stem extending within the bearing area in the longitudinal direction of the stem. It is of course separated by a wall from internal passage 74 and ports 54 sufficient to withstand the internal pressure which is applied to the joint.

Figure 6:
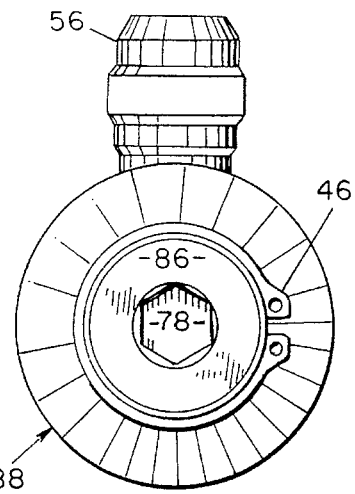
FIG. 6 is an end view of the joint of FIG. 5.

A modified pressurized fluid conducting rotary joint 80 utilizing the principle of the invention is illustrated in FIGS. 5 and 6. Joint 80 is drawn to a slightly longer scale. It is shown connected to a pressurized fluid connection 16. Joint 80 illustrates that a joint having the same stem installation clearance as a conventional rotary joint of FIG. 1, having equal flow passage geometry, having the same components, the same distance between the seals and a hex drive stem outside the barrel, can have an outer end portion of the stem having increased length with longer bearing surfaces and a longer barrel to increase wear resistance and operate at higher pressures. Joint 80 has the same collar 66 as the joint of FIG. 3, its thickness determined by the distance between abutment surface 68 and barrel seat 70. Collar 66 separates connection end 14 from outer end portion 84 of stem 82. Spaced apart seals 34, 36 have the same interseal spacing as the joints from FIGS. 1 and 3. Outer end portion 84 has an outer end 86. The overall stem installation clearance between abutment surface 62 and outer end 86 is understood to be the same as the conventional joint of FIG. 1. However, the length of the bearings on the stem and the corresponding bearings on the barrel 88 are substantially longer in the axial longitudinal direction of the stem and barrel. The bearings are spaced apart by conventional seals 34, 36 and in fact one edge of the seal groove is the upper edge of the lower bearing 90. The lower edge of the upper bearing 92 is the upper edge of seal groove 36. Lower bearing 90 extends from proximate barrel seat 70 to the lower edge of the seal groove of seal 34. The lower edge of bearing 92 defines the upper edge of the seal groove of seal 36 and extends to the small annular dust seal just below retaining ring 46 proximate outer end 86 of stem 82. Outer end 86 has the recessed socket opening 78 within bearing 92 for receiving the end of a conventional wrench that be used to install or remove joint 80.

Figure 7:
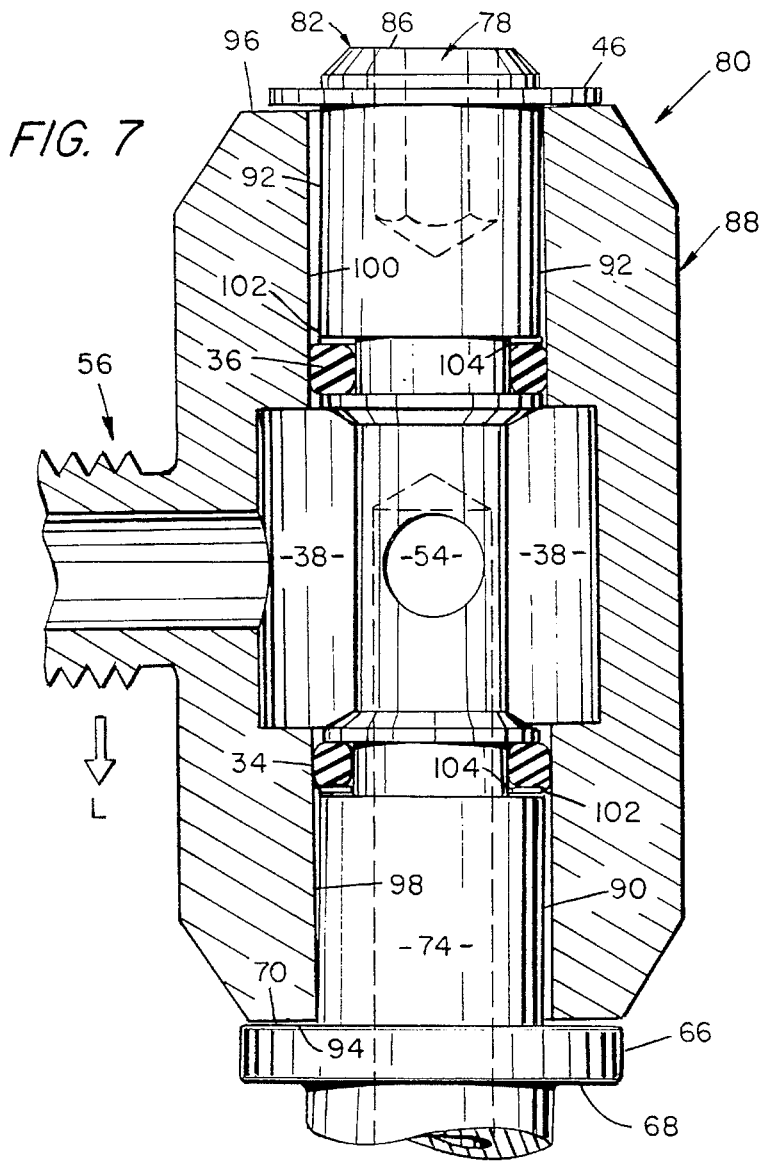
FIG. 7 is an enlarged cutaway elevational view of the joint of FIG. 6 illustrating the phenomenon of improved resistance to seal extrusion created by the lengthened bearings and outer barrel when misalignment from side loading occurs.

FIG. 7 somewhat schematically illustrates an important advantage of the embodiment of FIG. 5. In FIG. 7 the lower end 94 of barrel 88 is supported on barrel seat 70 of collar 66. Lower abutment surface 68 of collar 66 and connection end 14 are firmly engaged into a source of pressurized fluid in an operating system. Upper end 96 of barrel 88 is supported on the outer end portion 84 of stem 82 by means of retaining ring 46 proximate outer end 86 of the stem.

In response to a load "L" applied in the direction of the arrow to schematically indicated outlet 56 of barrel 88, there is created a stem and barrel side load angle of misalignment which tilts the rotary barrel in the manner shown. Lower support surface 98 of barrel 88 rests against lower bearing 90 of the stem on the left side of FIG. 7 while upper support surface 100 of barrel 88 is pulled away from upper bearing surface 92 and a small gap 102 is thereby created on opposite sides of seals 34 and 36. In spite of a thin teflon ring 104 which is conventionally used as shown outwardly of the pressure side of transfer chamber 38, there is a tendency of the extremely high pressure to extrude ring 104 and seals 34, 36 into some portion of gap 102. If some portion of the seal is extruded into gap 102, the rotation of the barrel can cause shearing away of portions of the seal and leakage leading to ultimate failure of the joint. Even though the barrel is closely fitted so that the diameter of the support surfaces 98, 100 approximates the diameter of the stem bearing surfaces 90, 92, there must be some clearance provided to install the barrel on the outer portion of the stem and clearance for rotational interface of the cylindrical stem and barrel bearing surfaces.

The reduced thickness of the collar 66 as compared to the conventional drive nut 22 has made it possible to increase the length of the outer portion 84 of the stem and provide longer bearing surfaces 90, 92 and a longer barrel without increasing the comparative stem installation clearance between barrel seat 70 and outer end 86 and without decreasing the interseal spacing between seals 34, 36. This combination of features produces a smaller gap 102 as compared with the conventional rotary joint illustrated in FIG. 1 having an equal nominal clearance between the bearings of the stem and barrel. Importantly, the longer bearing surfaces on a rotary joint, for example one having a ⅜ inch passage opening, is increased by approximately 155 percent. This increase results in a substantial reduction in unit pressure in the contact area between the bearing surfaces of the stem and the corresponding support surfaces of the barrel which greatly reduces wear in use and substantially extends the life of the improved joint before seal extrusion can take place. This improvement also makes it possible to increase the operating fluid pressure capacity of the improved joint from approximately 3000 psi to as much as 5000 psi without detrimentally affecting the life and compromising rated fluid flow volume capacity.

Figure 8:
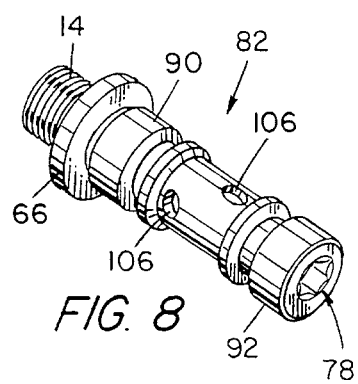
FIG. 8 is a perspective view of the stem of a small capacity rotary joint of the present invention with the lengthened bearings and multiple ports in the wall.

FIG. 8 illustrates stem 82 without the barrel wherein the wall of the stem in the area between the grooves for seals 34, 36 is provided with multiple ports 106 in communication with the passage 74. This is compared with the two ports 54 in FIGS. 1–7 which are obtained by crossdrilling the stem. Ports 106 are formed by drilling through the wall on both sides in two places 90 degrees apart so that there are four openings which are smaller than ports 54 but collectively have at least as much flow volume capacity for transferring fluid to chamber 38. This structure enables high torque to be applied to stem 82 at socket 78 without buckling or otherwise damaging the wall stem. It also insures that there is sufficient wall thickness to withstand surges in pressure which with a 4 to 1 safety factor on a 3000 psi pressure line can amount to 12000 psi.

The following examples illustrate some of the dimensional relationships of the new improved joints in several sizes as compared to the old conventional joints. Rotary swivel joints are conventionally referred to by the inside diameter of the flow passage in the stem. Rotary joints must be sized to a system in which they operate so that there is adequate flow volume and reduced velocity without excessive pressure drops across the joint. The safety factors and high operating pressures demand hefty wall thicknesses which increase the size of the joints. Therefore operating fluid flow volume cannot simply be obtained by boring out a smaller capacity joint. This in turn can lead to a need for joints with a smaller stem installation envelope clearance without comprised flow volume which is represented by the improved joint of FIG. 3. The following example illustrates the dimensional characteristics of two different sizes of these rotary joints.

EXAMPLE 1

| Joint | Reduced Stem Clearance/Same Bearing Length | | | | |
|---|---|---|---|---|---|
| | Flow Passage Diameter | Drive Nut Height | Collar Height | Barrel Length | Stem Installation Envelope Clearance |
| OLD | ¾" | .75" | — | 1.74" | 2.65" |
| NEW | ¾" | — | .25 | 1.74" | 2.15" |
| OLD | 1" | .79" | — | 1.95" | 2.90" |
| NEW | 1" | — | .25 | 1.95" | 2.37" |

The dimensions in Example 1 are taken from actual joints. Although the dimensions are scaled up somewhat in going from a smaller flow volume rated joint to a larger flow volume rated joint a substantial reduction in the stem installation clearance is seen. In the ¾ inch size the stem installation clearance is reduced 0.5 inches while in the 1 inch size the stem installation clearance is reduced 0.53 inches.

EXAMPLE 2

| Joint | Same Stem Clearance/Increased Bearing Length | | | | | | |
|---|---|---|---|---|---|---|---|
| Envelope | Flow Passage Diameter | Barrel Length | Maximum Bearing Spacing | Minimum Bearing Spacing | Total Bearing Length | Width of One Bearing | Stem Installation Clearance |
| OLD | ⅜" | 1.40" | 1.30" | 1.10" | 0.20" | 0.10" | 2.11" |
| NEW | ⅜" | 1.71" | 1.61" | 1.10" | 0.51" | 0.255" | 2.11" |
| OLD | ½" | 1.38" | 1.28" | 0.91" | 0.37" | 0.185" | 2.28" |
| NEW | ½" | 1.87" | 1.77" | 0.91" | 0.86" | 0.43" | 2.28" |

Example 2 represents the modification of FIGS. 5–8 in which the stem clearance between the old and new is held constant but the bearing surfaces are lengthened along with the outer portion of the stem and barrel. With the ⅜ inch joint there is an approximately 155 percent increase in contact surface of the bearings and an increase of about 132 percent for the ½ inch rotary joint. It should be noted with respect to both examples, that in all cases the spacing between seals 34 and 36 is the same as the prior art joint shown in FIG. 1. It would be possible to increase the bearing length by simply moving the seals closer together but this solution is undesirable because it reduces the rated volume flow capacity and adversely affects the pressure drop across the joint.

Example 2 shows substantial increase in the maximum bearing spacing which is the distance between the innermost edge and the outermost edge of the pair of bearings. It will be noted that the minimum bearing space for a joint of equal size is the same for the old and new because the spacing between the seals is constant and the innermost edges of the bearings form the edge of the seal channel to retain equal rated flow volume. In the ⅜ inch joint the bearings are lengthened from 1.30 inches to 1.61 inches, an increase of 23.8 percent. In the ½ inch joint the increase in maximum distance between the inner and outer bearings is 38 percent. These increases are very significant because when the bearings are further apart and the barrel is accordingly lengthened, the resulting gap at the seal with the same nominal diametrical clearance between the old and new stem bearing surfaces and barrel bearing surfaces, as illustrated in FIG. 7, is reduced. The range of the reduction in the gap 102 between old and new joints with the same stem installation envelope clearance is believed to range between about 8 percent and about 22 percent depending upon the flow volume rating of the joints. This has made it possible to increase the pressure capacity rating of comparable joints having the same stem installation clearance from about 3000 PSI to about 5000 PSI without reducing the life of the joints.

What is claimed is:

1. A pressurized fluid conducting rotary joint, comprising:

an elongated stem having a connection end threaded for connection to a source of pressurized fluid, an outer end portion extending oppositely from the connection end to an outer end and a laterally extending collar separating the threaded portion of the connecting end from the outer end portion of the stem;

said collar having a lower surface which serves as an abutment when the connection end is threaded to a source of pressurized fluid and an upper surface which comprises a barrel seat;

a removable barrel which fits over the outer end portion of the stem, the barrel having a lower end which is supported on the barrel seat and an upper end proximate the outer end of the stem which is held by a retaining ring mounted at the outer end of the stem;

the outer end portion of the stem having a pair of support bearings comprising a lower support bearing proximate the barrel seat, an upper support bearing proximate the outer end of the stem and a pair of seals spaced apart by a seal distance, comprising a lower seal next to the lower support bearing and an upper seal next to the upper support bearing wherein said support bearings together with said seals forms a fluid transfer chamber between said seals within the upper portion of the stem and the barrel;

the barrel having an upper and a lower support surface corresponding to the upper and lower bearing surfaces of the stem, each of said support surfaces of the barrel being of sufficient length to sealingly engage one of the seals of the stem;

the barrel having an external connection in fluid communication with the fluid transfer chamber:

a pressurized fluid passage in the stem which communicates with the fluid transfer chamber and delivers pressurized fluid at rated flow volume to the external connection on the barrel; and the outer end of the stem having a blind socket opening within the upper support bearing for receiving a wrench suitable for rotating the stem to secure or remove the threaded connection end from the source of pressurized fluid without creating a path for contaminants to enter through the outer end of the stem.

2. The pressurized fluid conducting joint of claim 1 wherein the collar is an annular disc having a curved outer periphery.

3. The pressurized fluid conducting joint of claim 1 wherein the stem installation clearance between the abutment surface and outer end of the stem is reduced about at least 15 percent as compared to an otherwise identical pressurized fluid flow volume rated joint having a hex drive stem below the barrel.

4. The pressurized fluid conducting joint of claim 1 wherein the stem installation clearance between the abutment surface and the outer end of the stem is not reduced as compared to a conventional substantially equal pressurized fluid flow volume rated joint of equal flow passage geometry having the same components, the same distance between seals, and a hex drive stem below the barrel, but the outer end portion of the stem and the barrel are increased in length at least about 20 percent as compared with said conventional joint without increasing the stem installation clearance.

5. The pressurized fluid conducting joint of claim 1 wherein the support bearing surfaces on the stem and the corresponding support surfaces on the barrel are increased at least about 100 percent in length as compared to a conventional substantially equal pressurized fluid flow volume rated joint of equal flow passage geometry having the same components, the same distance between the seals, the same installation clearance and a hex drive stem below the barrel, without increasing the stem installation clearance, wherein a greater distance between the outermost portions of the support bearing surfaces and a greater barrel length reduce the maximum permissible gap between the stem and barrel in the vicinity of the seals caused by side loading of the barrel to substantially increase the permissible operating pressure by reducing the tendency for extrusion of the seals in response to operating pressure.

6. The pressurized fluid conducting rotary joint of claim 1 wherein the collar height between the abutment surface and barrel seat is less than about twenty-five percent of the length of the barrel.

7. The pressurized fluid conducting rotary joint of claim 1 wherein the collar height between the abutment surface and the barrel seat is less than about fifteen percent of the length of the barrel.

8. The pressurized fluid conducting rotary joint of claim 1 wherein the collar height between the abutment surface and barrel seat does not exceed about one quarter inch.

9. The pressurized fluid conducting rotary joint of claim 1 wherein the collar height between the abutment surface and the barrel seat does not exceed about one eighth of an inch.

10. The pressurized fluid conducting rotary joint of claim 8 wherein the stem has at least three ports leading to the transfer chamber.

11. The pressurized fluid conducing rotary joint of claim 1 wherein the sum of the length of the upper and lower bearings on the stem is more than about twenty percent of the barrel length.

12. The pressurized fluid conducing rotary joint of claim 1 wherein the sum of the length of the upper and lower bearings on the stem is more than about thirty-five percent of the barrel length.

13. A method of making an improved pressurized fluid conducting rotary joint comprising an elongated stem having a connection end having threads for connection to a pressurized fluid source and an integral drive nut above the threads having a thickness defined by a lower surface and an upper surface which serves as a barrel seat, the stem having an outer end portion extending outwardly from the barrel seat to an outer end and a removable barrel which fits over the outer end portion of the stem, the barrel having a lower end which is supported on the barrel seat and an upper end proximate the outer end of the stem, which is held by a retaining ring mounted at said outer end of the stem, the outer end portion of the stem having a lower support bearing adjacent the barrel seat, an upper support bearing adjacent the outer end of the stem and a pair of spaced apart seals comprising a lower seal next to the lower support bearing and an upper seal next to the upper support bearing wherein said support bearings together with said seals form a fluid transfer chamber between the outer end portion of the stem and the barrel, the barrel having upper and lower support surfaces that cooperate with the upper and lower support bearings of the stem and are separated by the fluid transfer chamber in the central portion of the barrel, a pressurized fluid passage in the stem which communicates with the fluid transfer chamber and delivers pressurized fluid of rated flow volume to an external connection on the barrel;

the improvement comprising forming the outer end of the stem with a blind recessed drive means extending within the upper bearing of the stem to receive a wrench for rotating the stem in order to secure the connection end to the source of pressurized fluid, substantially reducing the thickness between said lower surface and said barrel seat and reducing the overall length between the barrel seat and the outer end of the stem an amount corresponding to said reduction in thickness so that the rotary joint has substantially improved stem installation clearance as compared to a conventional rotary joint of substantially the same pressure rated flow volume capacity, equal flow pressure geometry, the same components, the same distance between seals and said integral drive nut on the stem.

14. The method of making the improved pressurized fluid rotary joint of claim 13 wherein the step of substantially reducing the thickness between the lower surface and said barrel seat is the step of reducing said thickness to less than about twenty-five percent of the length of the barrel.

15. The method of making the improved pressurized fluid rotary joint of claim 13 wherein the thickness between the lower surface and said barrel seat is the step of reducing said thickness to less than about fifteen percent of the length of the barrel.

16. The method of making the improved pressurized fluid rotary joint of claim 13 wherein the thickness between said lower surface and said barrel seat does not exceed about one-quarter inch.

17. The method of making an improved pressurized fluid conducting rotary joint comprising a stem having a threaded inner connection end equipped with a drive nut proximate the inner connection end for tightening the stem to a pressure source, the drive nut having a lower surface comprising an abutment and an upper surface comprising a barrel seat, the stem having an outer end portion above the barrel seat and an outer end with a barrel retainer proximate the outer end, a blind passage opening extending from the inner connection end having a port for passing a given fluid flow volume in communication with a transfer chamber formed between inner and outer seals spaced apart a seal distance, the stem further having an inner bearing surface between the barrel seat and inner seal and an outer bearing surface between the outer seal and the barrel retainer; a barrel having an inner end and an outer end, a length extending between the barrel seat and the barrel retainer, a port and outlet communicating with the transfer chamber, inner and outer support surfaces corresponding to the inner and outer bearing surfaces of the stem and including a sealing portion in sealing contact with the inner and outer seals, the improvement comprising;

providing a reduced height collar on the stem in substitution of said drive nut, said collar being reduced in height by an amount equal to at least 50 percent of the height of the drive nut on a conventional rotary joint of that same pressure rated flow volume, increasing the length of the stem and barrel and the length of the upper and lower bearings an amount corresponding to the change in height of the collar with respect to the drive nut and providing a blind internal drive means recessed entirely within the outer end of the stem for receiving an end of a wrench for tightening or loosening the joint without creating a path for contaminants to enter the stem through said drive means whereby the improved joint has substantially increased length of the bearing area between the stem and barrel without increasing the stem installation clearance as compared with said conventional rotary joints.

18. The method of claim 17 wherein the step of providing said collar is the step of providing a collar reduced in height by at least about 75 percent of the height of the drive nut on a conventional rotary joint of the same rated flow volume capacity.

19. For installation and use in pressure fluid systems, an improved pressure balanced fluid conducting conventional rotary joint having a rated flow capacity of a type including an elongated tubular fluid passage stem with a threaded inner connection end portion and an external wrench receiving hexagon on the stem separating the threaded inner end portion from the remainder of the stem and having a barrel supporting surface, said stem being transversely ported proximate a blind end and having about equal size bearing journals symmetrical to said transverse ports and matched to bearings in the bore of a cylindrical and ported barrel mounted on the stem and supported by the barrel supporting surface, where the ported stem has equal size seals symmetrical to its transverse ports and is balanced to fluid pressure to provide relatively low torque for permitting rotation of at least one connected fluid conductor, the improvement comprising the combination of:

an elongated stem having a pair of about equal size bearing journals separated by transverse fluid ports communicating an internal fluid passage blinded at about the outermost journal, the stem having an outer end and an opposing open opposite connection end having an externally threaded connector comprising a connection end for attaching to a pressure fluid system, an improved blind position wrench socket within the end of the outermost bearing journal apart from the fluid passage to prevent contamination, an outer portion of the outermost bearing journal externally circumscribed by a groove receiving a load bearing ring, the stem having a relatively narrow and radially extended load bearing collar circumscribing the stem to separate the threaded connection end from the rest of the elongated stem, said collar having a lower surface which serves as an abutment when the connection end is threaded to a source of pressure fluid, and an upper surface which serves as a thrust bearing for the lower end of a barrel, a generally cylindrical barrel having opposing essentially equal end faces and opposing and essentially equal length internal bearings symmetrical about a laterally extended open end threaded connection for attaching to a pressure fluid system, said barrel retained in alignment to the stem bearing journals, the lower end face supported by said collar and the upper end face supported by the load bearing retaining ring installed above the outermost stem bearing journal, said stem bearing journals comprising a lower journal proximate the stem collar, an upper journal proximate the stem outer end, a pair of equal size fluid seals spaced apart by a distance and comprising a lower seal and an upper seal to form a sealed fluid flow annulus around the stems outer diameter symmetrical to the stems transverse ports, said barrel internal bearings comprising an upper bearing and a lower bearing proximate the respective barrel ends, spaced to compliment the stems respective upper and lower journals, each of said barrel bearings being extended to seal one of said equal size fluid seals to form a sealed bore flow annulus about symmetrical to the laterally extended open end connection and corresponding to the stem flow annulus, and wherein said collar is reduced in height compared to the corresponding height of the external wrench receiving hexagon on the stem of said conventional rotary joint of the same flow rated volume capacity to permit a decrease in stem installation clearance without reducing the bearing area of the stem and collar or an increase in bearing area of said stem and collar corresponding to the decrease in height of said collar, without increasing stem installation clearance.

20. The pressure balanced fluid conducting rotary joint of claim 19 where the stem installation clearance between the lower surface of the collar and the outer end of the stem is reduced at least 15 percent as compared to an otherwise identical pressure fluid flow volume rated rotary joint having a hex drive stem and barrel.

21. The pressure balance fluid conducting rotary joint as in claim 19 wherein the stem installation clearance between the collar lower surface and the external exposed wrench socket at the end of the stem is not reduced compared to a conventional pressure fluid conducting rotary joint of equal flow passage geometry and rating having the same components, the same distance between seals, and a hex driven stem below the barrel, but the outer end portion of the stem and barrel are increased about 20 percent as compared with said conventional rotary joint without increasing the stem installation clearance.

22. The pressure balanced fluid conducting rotary joint as in claim 21 wherein the load bearing journals of the stem and the corresponding barrel bearing journals are increased at least about 150 percent in length as compared to a conventional pressure balanced rotary joint of equal flow passage geometry and flow rating having the same components, the same distance between the seals, the same installation clearance and a hex drive stem below the barrel, to substantially increase bearing life and increase operating pressure by reducing the tendency for seal extrusion in response to fluid pressure.

23. The pressure balance fluid conducting rotary joint as in claim 19 wherein the distance between the collar lower surface and the collar upper surface is relatively small to reduce barrel overhang as compared to conventional pressure fluid conducting joints of equal flow passage geometry and flow rating, having the same components, the same distance between seals, and a hex drive stem below the barrel.

* * * * *